UNITED STATES PATENT OFFICE.

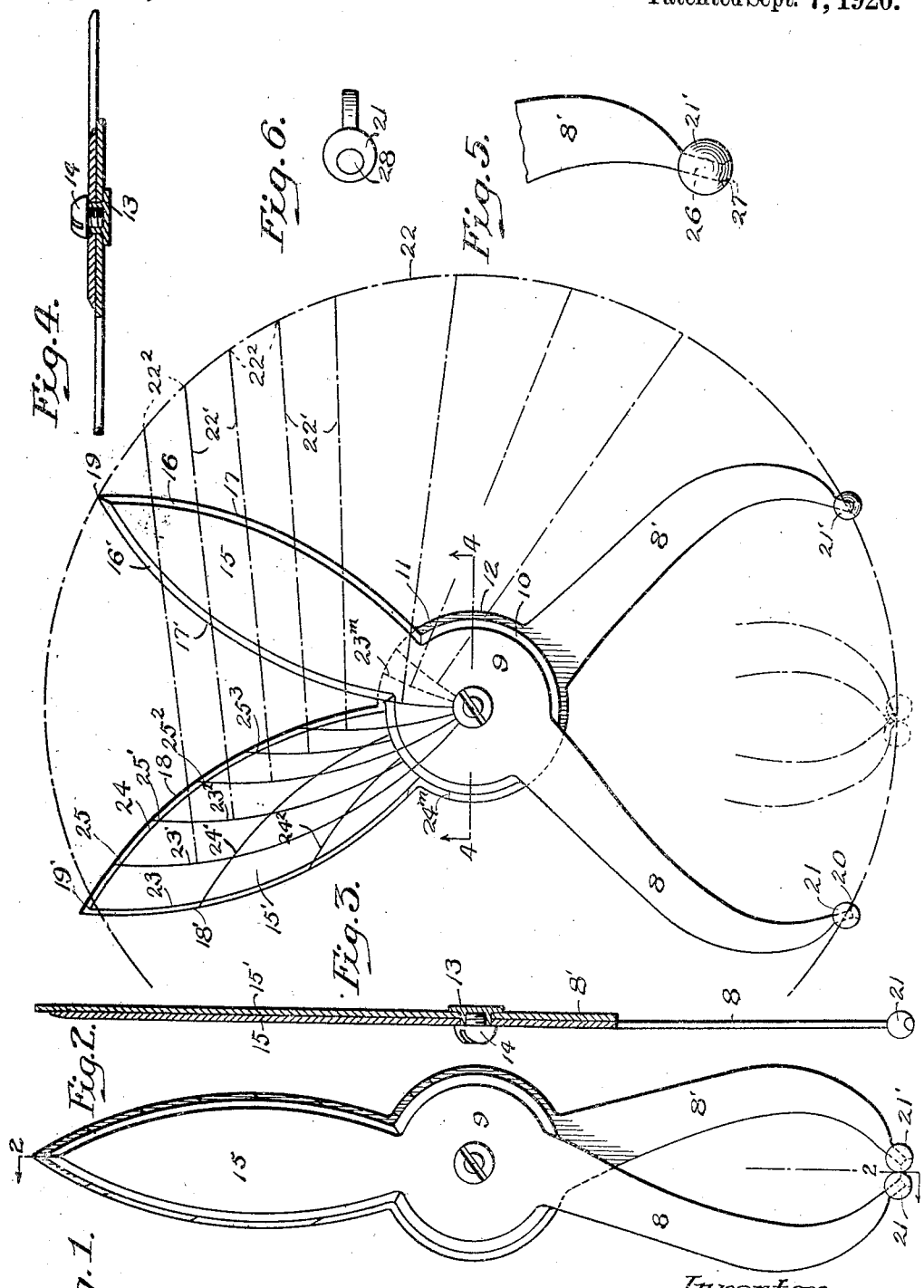

KNUT ELVING SOLBERG, OF PHILADELPHIA, PENNSYLVANIA.

MEASURING-CALIPERS.

1,351,804.  Specification of Letters Patent.  Patented Sept. 7, 1920.

Application filed May 14, 1919. Serial No. 297,012.

*To all whom it may concern:*

Be it known that I, KNUT ELVING SOLBERG, a subject of the King of Sweden, residing at 2331 St. Albans Place, Philadelphia, in the county of Philadelphia and State of Pennsylvania, have invented certain new and useful Measuring-Calipers, of which the following is a specification.

My invention relates to calipers of a type in which the jaws are extended back of the pivot point for the purpose of indicating the measurement of the calipers.

The purposes of my invention are to provide approximately uniform spacing of the lines upon the measuring scale for the same change of caliper opening.

A further purpose is to extend the jaws back of the pivot to a radius corresponding to that of the measuring ends of the jaws.

A further purpose is to form one, at least, of the measuring extensions with curved side contours, corresponding preferably to arcs of circles each of a radius equal to the length of the caliper legs.

A further purpose is to lay out the contour of one projection successively upon the surface of another to indicate the openings corresponding to different measurements. This can be done for "inside" caliper measurements, as well as for "outside" caliper use.

A further purpose is to provide adjustment of the contact surfaces upon the jaws.

Further purposes will appear in the specification and in the claims.

I have preferred to illustrate my invention by but one among the various forms in which it might appear, selecting a form which is practical, efficient and easily and reliably manufactured and which at the same time well illustrates the principles of my invention.

Figure 1 is a top plan view of a pair of calipers embodying my invention in closed or "zero" position.

Fig. 2 is a section of Fig. 1 upon line 2—2.

Fig. 3 is a top plan view of my calipers in open position with construction lines to indicate the way in which the markings are laid out.

Fig. 4 is a section of Fig. 3 upon the line 4—4.

Figs. 5 and 6 are broken elevations showing contact terminals of the jaws.

In the drawings similar numerals indicate like parts.

Though my calipers are provided with the usual legs 8, 8' intended primarily for use as "outsides" but capable of use as "insides," indicated by dotted lines in Fig. 3, both the contact tips and the bearing portions of said legs are different from the usual calipers.

The bearing portion of the leg 8 is relatively enlarged at 9 and chamfered at 10 to give a sharp edge against the exposed surface 11 of a larger bearing portion 12 upon the leg 8'. The joint is held in position by a solid head nut 13 and screw 14.

On the other side of the bearing portions of the legs 8 and 8' extensions 15 and 15' are formed for the purpose of providing measuring indications as to the extent of opening of the caliper legs.

The extension 15 is chambered as at 16, 16', providing sharp and preferably curved edges 17 and 17' adapted, in zero position, to rest upon extension 15' so as to leave exposed annular surfaces 18 and 18' upon the latter.

The extension 15 is of the same length from the pivot to its end 19, as the length of either of the caliper legs 8 or 8' from the pivot to the intended contact point upon the ball terminal; and the edge of the extension 15 is arcuate, the arc having a radius equal to the length of either of said legs.

The circle 22, which passes through the end 19 of the extension 15 and the caliper contact points, in the best form of the invention known to me, forms a locus of the centers of curvature of the various curves 23, 23', 23², etc., defined by the edge 17' upon the surface of extension 15' at zero position and with different settings for outside calipering.

For the same reason the same circle forms a locus of the centers of the arcs 24, 24', 24², etc., defined by the edge 17 upon the surface of extension 15' at the zero position and with different settings for inside calipering.

For openings, either as outsides or insides, of sufficient angle for the extension 15 not to overlie any part of the extension 15', portions of the curves corresponding to 23, 23', etc., 24, 24', etc., are laid off upon the exposed angular surface 11 as at 23$^m$ and 24$^m$. These graduations 23, 23', etc., 24, 24', etc., are placed at any desired intervals corresponding with fractions of an inch of opening and the extent of opening for intermediate positions of the extension 15 with respect to the underlying extension 15′ can readily be estimated. The estimation is simplified by the fact that the distances at which the curve 24 is cut by the curves 23′, 23², etc., are equal for equal fractions of an inch represented. That is, the distances upon the curve 24 between points 19′, 25, 25′, 25², 25³, etc., are all equal. Correspondingly the distances between the points on curve 23 where it is cut by the curves 24, 24′, 24² are equal.

The radii for laying out the different curves are shown at 22′ and as having their centers at 22² in the curve 22.

In order to free the caliper from inaccuracy due to wear of the contact surfaces and consequently increase of the opening beyond that represented by the positions of the two leg extensions, I provide caliper tips or contact members in ball form capable of being turned to present new parts of said members for contact. As shown the balls 21, 21′ are mounted upon pin terminals 26 and are counterbored or recessed as at 27 to permit riveting of the ends of the pin at 28 for ball retention. The balls are intended to be held against rotation with sufficient tightness so as not to turn in use but to permit turning when wear has taken place.

In operation the calipers are closed to the position shown in Fig. 1. If the surfaces in contact upon the balls are not worn the end 19 of the extension 15 will correspond with the point 19′ upon the extension 15′. If they do not correspond, indicating wear, the balls are turned slightly to present new and unworn points for contact, thus resetting to "zero." The construction permits of ready verification adjustment in this regard by the user at any time.

The curves 23, 23′, etc., 24, 24′, etc., are laid off upon the extension 15′ initially and may be determined by actual setting and scribing or by the use of a dividing engine.

It will be obvious that the graduations for the inside caliper use could be placed upon the extension 15 instead of upon the extension 15′ so that each type of caliper use would have a distinct set of markings upon a separate extension.

Having thus described my invention, what I claim as new and desire to secure by Letters Patent is:—

1. In measuring calipers, a pair of caliper legs having pivoted bearing portions and extensions beyond said portions adapted to overlie one another when the caliper measurements are small, one extension having graduations corresponding to the edge of the other extension and equidistantly spaced to indicate different predetermined spacings between the work contact ends of said legs.

2. In measuring calipers, a pair of caliper legs having bearings therefor and extensions of the legs beyond the bearings, adapted one to overlie the other when the caliper measurement is small, the under extension having a curved edge and marked with indications corresponding to predetermined caliper openings.

3. In measuring calipers, a pair of caliper legs having bearings therefor and extensions of the legs beyond the bearings, adapted one to overlie the other when the caliper measurement is small, the under extension having a curved edge of radius equal to the caliper radius and marked with curved indications corresponding to predetermined caliper openings, the curves being reversely turned for outside and inside caliper use respectively.

4. A pair of calipers comprising a pair of legs having bearings and extensions of the legs beyond the bearings, both of the extensions having curved edges coöperating for indication purposes and the concavities of the curves facing each other.

5. A pair of calipers comprising a pair of legs having bearings and extensions of the legs beyond the bearings, one of the extensions having a curved edge adapted to fit over the other extension in the smaller measurements by the calipers, the underlying extension being marked at predetermined spaced intervals in correspondence with the curved edge of the overlying extension and the markings terminating at decreasing distances from the bearings.

6. A pair of calipers comprising a pair of legs having bearings and extensions of the legs beyond the bearings, one of the extensions having a curved edge adapted to fit under the other extension in the smaller measurements by the calipers, the underlying extension being marked at predetermined spaced intervals in correspondence with the curved edge of the overlying extension and the markings terminating at decreasing distances from the bearings.

7. A pair of calipers comprising caliper legs having bearings and extensions of the legs beyond the bearings adapted one to lie over the other in the smaller measurements by the calipers and one having an edge approximating the arc of a circle of radius corresponding to the radius of the caliper contacts.

8. A pair of calipers comprising caliper legs having bearings and extensions of the legs beyond the bearings adapted one to lie over the other in the smaller measurements by the calipers and having an edge approximating the arc of a circle of radius corresponding to the radius of the caliper contacts, the underlying extensions being marked with corresponding curved lines at predetermined intervals agreeing with the caliper measurements.

9. A pair of calipers comprising caliper legs having bearings therefor and extensions of the legs beyond the bearings adapted one to lie over the other with the smaller caliper measurements and one of them provided with markings to indicate the measurement, in combination with contacts for the calipers adjustable to reset the zero point of the calipers.

10. A pair of calipers having caliper legs having bearings therefor and means for indicating the extent of measurement in combination with contact terminals for the legs adapted to be moved to present different faces in case of wear.

11. A pair of calipers comprising caliper legs having bearings therefor in combination with ball contact terminals and pins upon which the balls are mounted to provide friction but adapted to be turned upon the pins to present different ball faces for contact.

KNUT ELVING SOLBERG.